United States Patent
Fruchter et al.

(10) Patent No.: US 7,458,013 B2
(45) Date of Patent: Nov. 25, 2008

(54) CONCURRENT VOICE TO TEXT AND SKETCH PROCESSING WITH SYNCHRONIZED REPLAY

(75) Inventors: Renate Fruchter, Los Altos, CA (US); Pratik Biswas, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 429 days.

(21) Appl. No.: 10/824,063

(22) Filed: Apr. 13, 2004

(65) Prior Publication Data

US 2004/0193428 A1 Sep. 30, 2004

Related U.S. Application Data

(63) Continuation-in-part of application No. 09/568,090, filed on May 9, 2000, now Pat. No. 6,724,918.

(60) Provisional application No. 60/133,782, filed on May 12, 1999.

(51) Int. Cl.
*G06F 17/27* (2006.01)
*G06F 17/21* (2006.01)

(52) U.S. Cl. .......... 715/203; 715/200; 715/201; 715/202; 715/205; 715/230; 715/233

(58) Field of Classification Search .......... 715/500, 715/500.1, 501.1, 502, 512, 200, 201, 202, 715/203, 205, 230, 233
See application file for complete search history.

(56) References Cited

U.S. PATENT DOCUMENTS

| | | | | |
|---|---|---|---|---|
| 5,564,005 A * | 10/1996 | Weber et al. | | 715/863 |
| 5,832,065 A | 11/1998 | Bannister et al. | | 379/93.08 |
| 5,893,053 A | 4/1999 | Ttueblood | | 702/187 |
| 5,915,003 A | 6/1999 | Bremer et al. | | 379/93.19 |
| 5,969,500 A | 10/1999 | Ishikawa et al. | | 318/807 |
| 6,041,335 A | 3/2000 | Merritt et al. | | 715/512 |
| 6,072,832 A | 6/2000 | Katto | | 375/240.28 |
| 6,279,014 B1 | 8/2001 | Schilit et al. | | 715/512 |
| 6,415,256 B1 * | 7/2002 | Ditzik | | 704/231 |
| 6,437,818 B1 | 8/2002 | Ludwing et al. | | 348/14.09 |
| 6,665,835 B1 * | 12/2003 | Gutfreund et al. | | 715/500.1 |
| 7,096,416 B1 * | 8/2006 | Smith et al. | | 715/500.1 |
| 7,167,191 B2 * | 1/2007 | Hull et al. | | 715/748 |
| 2002/0031243 A1 | 3/2002 | Schiller et al. | | |
| 2002/0107885 A1 | 8/2002 | Brooks et al. | | 707/505 |
| 2002/0188943 A1 | 12/2002 | Freeman et al. | | 725/38 |
| 2003/0018662 A1 * | 1/2003 | Li | | 707/500.1 |
| 2003/0024975 A1 * | 2/2003 | Rajasekharan | | 235/375 |

* cited by examiner

Primary Examiner—Joshua D Campbell
(74) Attorney, Agent, or Firm—Lumen Patent Firm, Inc.

(57) ABSTRACT

The present invention facilitates transparent and cost effective capture, sharing, and re-use of knowledge in informal media such as audio, video, and individual sketching actions. Sketches, handwritings, verbal comments and the likes captured during a session are timestamped and, once completed, automatically indexed and published on a web server that allows for real time, streamed and synchronized replay thereof. All timestamps are converted to a common time base. To control the synchronous replay, multiple treads collaborate based on common base timestamps corresponding to the sketching actions and correlated audio/video stream(s). An enhanced interactive graphical user interface enables a network user to create and capture a session, e.g., annotate an imported image with sketches and verbal comments. The user or others can access the published session in real time and select a keyword or an individual sketch entity from which to begin replay. Transcribed audio stream can also be synchronously replayed.

11 Claims, 10 Drawing Sheets

CONCURRENT VOICE TO TEXT AND SKETCH PROCESSING WITH SYNCHRONIZED REPLAY

CROSS-REFERENCE TO RELATED APPLICATIONS

This application is a continuation-in-part of a U.S. patent application Ser. No. 09/568,090 U.S. Pat. No. 6,724,918, issued on Apr. 20, 2004, filed May 9, 2000, which claims priority from a provisional patent application No. 60/133,782, filed on May 12, 1999, both of which are hereby incorporated by reference.

FIELD OF THE INVENTION

This invention relates generally to network communication and, more particularly, to new processing modules and enhanced functionalities of a system and method for indexing, accessing, and retrieving concurrent voice, text, and sketch activity information with synchronized replay.

DESCRIPTION OF THE BACKGROUND ART

One major problem of multimedia communication is the large variation in the data amount of the transmitted audio and visual information. These discrepancies occur because visual and verbal information are typically correlated in an information exchange event. As a result, high data amount of simultaneous audio and visual information tend to exceed the transmission capacities of the communication infrastructure. For example, in a public switched telephone network (PSTN), a signal distributed between a number of users can carry only a certain amount of information within a given time period. The transmission of visual and verbal information therefore needs to be buffered to allow the transmission of more sophisticated visual information.

The buffering of the information is typically accomplished by independently saving audio information and/or video information. This buffering is accomplished temporally and/or permanently, at the location where the information is created and/or at a remote location. Subsequently, the correlated information is transmitted chronologically with a certain user definable parameter.

U.S. Pat. No. 4,656,654, issued to Dumas, discloses a PSTN-based computer-assisted graphic teleconferencing method and apparatus. In Dumas, graphics and voice can only be communicated alternately. Thus, with Dumas, it is not possible to simultaneously distribute a sketching activity with the contemporaneous explanatory verbal information. In addition, Dumas's invention is embodied in a PSTN-based network and not a distributed computer network such as the Internet.

U.S. Pat. No. 5,832,065, issued to Bannister et al., discloses a PSTN-based synchronous voice/data message system that allows the exchange of audio-graphic messages between specific portable communication devices via a PSTN. More specifically, Bannister et al., discloses how simultaneously generated voice and graphical information can be transmitted over separate voice and data links and synchronized at a recipient's respective voice apparatus and data apparatus. Bannister et al. suggest that a user may wish to develop a sketch or drawing while discussing a mater with a party receiving a phone call.

However, Bannister et al.'s message system neither recognizes nor captures drawing movements of a sketching activity. It is the result of the sketch or drawing activity that is being indiscriminately transmitted as a whole. Information related to the content and/or context of the sketching or drawing activity is ignored. The drawing movements are not captured or utilized.

On the other hand, Bannister et al.'s message system provides a replay function to display the content creation process of the graphical information together with the corresponding voice information based on a time stamping approach. In addition, the message system simultaneously replays the correlated verbal information. The chronological voice and data/graphics can be replayed at different speeds.

Unfortunately, Bannister et al.'s message system is unidirectional and chronological. It does not provide contextual information of a chronologically retrieved message. A user cannot selectively access segments of the chronologically retrieved message. Nor can the user interactively access and select any voice or graphic segment thereof and replay from that segment and on. Moreover, to utilize Bannister et al.'s message system, a user is required to have or have access to a correct or compatible communication device. Otherwise, it is not possible to communicate with another person audio-graphically. Finally, Bannister et al.'s invention is embodied in a PSTN-based point-to-point communication network and requires a centralized switching office or switch center. It is not implemented in a distributed computer network such as the Internet.

The Internet, especially the World Wide Web, has been becoming an increasingly important communication medium in recent years. A number of software products and web pages exist to provide users with possibilities to exchange and collaborate audio/graphical information in substantially real time.

For instance, the RealityWave, Inc. of Cambridge, Mass., USA, provides an Internet-based software platform called VizStream® that allows three-dimensional (3D) graphics to be embedded within a web page accessible by a client user. RealityWave's VizStream® platform enables the access, visualization, and integration of industrial data, including complex 3D models, 2D drawings, and associated information for web-based collaboration and communication. With hierarchical streaming, VizStream® allows 3D graphics and models to be viewed, animated, refined, and configured over a network connection.

Unfortunately, even though RealityWave's software provides an enhanced display technique, it is limited to prepared documents. The client user cannot spontaneously adding sketches or comments to the prepared drawing or document. There is no spontaneity and no bidirectional information exchange of information. Further, only 3D models are displayed and no additional media information like, for instance, audio, video, and graphics.

RealityWave and other existing web-based services and software platforms restrict the users to use predetermined graphical symbols together with written text. Visual information needs to be manually added. Sophisticated information elements within a single displayed image and/or in a chronological context are not captured. What is more, pertinent corresponding audio and/or video information is neither incorporated nor correlated.

Clearly, there exists a continuing need for an advanced multimedia communication system and method that enables two or more persons to easily and effectively communicate and interact with one another via a distributed computer network in substantially real time without being limited by special or specific equipments.

SUMMARY OF THE INVENTION

It is therefore an object of the present invention to provide a system and method that enables synchronous multimodal collaboration in a distributed network. Users having computers connected to the network would be able to share, exchange, and collaborate content rich multimedia information, including free hand sketching activities or drawing movements, text, audio, video, CAD models, etc. This object is achieved in a computer system implemented with an innovative software application that captures and indexes each individual action on the drawing surface and synchronizes it with audio/video (AV) capture and encoding through a client-server architecture. Such a computer system is hereinafter referred to as a RECALL™ system. Preferably, the RECALL™ application is written in Java, although other suitable computer programming language is possible.

The RECALL™ system comprises an interactive graphical user interface (GUI) having a color pallet and a "tracing paper" metaphor that enables a user or users to re-use a computer graphic or image file, e.g., a computer-assisted drawing (CAD) image, and create multiple sketches on top of the CAD image. That is, during the production phase of a RECALL™ session, users can create free hand sketches and/or handwritings without a background image or import background images and annotate them. The RECALL™ system may employ software and hardware devices, e.g., a microphone, a video camera, a mouse, a digitizer board, a smart board, a multimodal pen or screen, etc. to capture multimodal interaction activity information such as the user's facial expression, gesture, voice, and/or audio stream produced during a RECALL™ session.

Once the session is complete, the captured information, e.g., drawing and video/audio data, is automatically indexed and published on a web server, such as a RECALL™ Web Server, that enables distributed and synchronized playback of the drawing session and correlated audio/video clips from anywhere at anytime. Via appropriate output and display means, the correlated and synchronized sketches, voice, text, and/or video are synchronously and accurately replayed to the user.

The rich and informative content enables the participating users to communicate the rationale and context in which their concepts, proposed changes, or questions came up. The interactivity with the content enables users to access the content part of interest and manage information overload. More specifically, with RECALL™, a user can conveniently and simply select an individual element, e.g., a sketch object or a keyword, as an index and jump to that part of interest. The particular ability to accurately "recall" a session in its entirety and in great details, as well as the ability to allow users to freely recall a fragment of the session from a point of interest, afford RECALL™ technology with distinct advantages over conventional media capture technologies.

The RECALL™ system comprises several modules to process the captured multimedia/multimodal interaction information. In particular, an enhanced recognition module processes the audio stream captured during the session and a voice to text and sketch (V2TS) replay module enables a real-time, streamed, and synchronized replay of the session, including the drawing movements and the audio stream.

The recognition module recognizes words or phrases of an audio file created in a RECALL™ session and stores the recognized occurrences and corresponding times. The recognition module integrates a voice to text (V2T) engine to transform the voice to text. For more effective recognition, the V2T engine preferably has some trained user profiles for different speakers. The recognition module takes as input the project name of the session and the user data. The audio file corresponding to the project is first converted to a format recognizable by the V2T engine. The V2T engine is then initialized and, upon the initialization, it starts to transcribe. Every time the V2T engine identifies a recognizable phrase, it records a timestamp and the recognizable phrase in a text file. At the end of transcribing, it records the start and end of file timestamps in byte format.

The V2TS replay module comes into play in the replay where the stored data is used to display the recognized words and phrases in sync with the session and begin playing the session from the point when the corresponding keyword was spoken. To achieve synchronization, all different streams of data should be played in a manner that minimizes the discrepancy between the times at which concurrent events in each of the streams occurred. Accordingly, the V2TS replay module utilizes a conversion mechanism to convert timestamp information for all the streams into a common time base. The conversion mechanism for the transcribed data implements a particular algorithm described below.

As discussed before, the recognition module stores the session start and end timestamps in byte format for the transcribed data. According to an aspect of the invention, the session start and end times are stored in system clock format during the production phase of the session. Thus, for a recognized word/phrase, the corresponding system clock time can be found by scaling the raw byte data by a factor that is determined by the ratio of the time duration of the session in system clock and the time duration in bytes. That is, $$\text{transcribed data timestamp} = (Tr*Ds/Dr) + Tsst$$

where
  $Tr$=(raw transcribed data timestamp−raw start time)
  $Ds$=(system clock session end time−system clock session start time)
  $Dr$=(raw end time−raw start time)
  $Tsst$=system clock applet start time.

The Tsst term is later subtracted from the calculated value to obtain the common base timestamp.

The RECALL™ technology enables users to easily, accurately, and conveniently share their ideas and decisions with users virtually at anywhere. Multiple users at the same or different locations can exchange information added to a graphical and multimedia document essentially simultaneously. The instant invention further enables users to share detailed multimedia/multimodal interaction information, especially sketches and drawing movements, and to reuse knowledge from project to project.

The RECALL™ technology disclosed herein captures the correlation between graphical and other multimedia/multimodal interaction information and enables a chronological, detailed replay thereof. In some embodiments, a user can perform a keyword search for a session to identify all the keyword instances in that session and begin re-playing the session from the point when the corresponding selected keyword was spoken. Alternatively, a user can navigate through the session and jump to a particular part of interest by selecting individual sketch elements, as described above.

In addition to the aforementioned advantages, the present invention has many useful applications and offers many advantages over existing knowledge capture and interactive communication technologies. For example, the present invention provides users with zero or little overhead cost for indexing and publishing on the Web rich content in the form of sketches, audio and video, as well as real time interactivity with the rich content. In terms of interaction among participating users, the present invention enables a fast turnover of information and feedback. For example, an instructor can have an insight into a learner's thought process; similar benefits can be observed in play mode or in customer relation management. Since the knowledge is in context, participating users can therefore make informed decisions.

Still further objects and advantages of the present invention will become apparent to one of ordinary skill in the art upon reading and understanding the detailed description of the preferred embodiments and the drawings illustrating the preferred embodiments disclosed herein.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
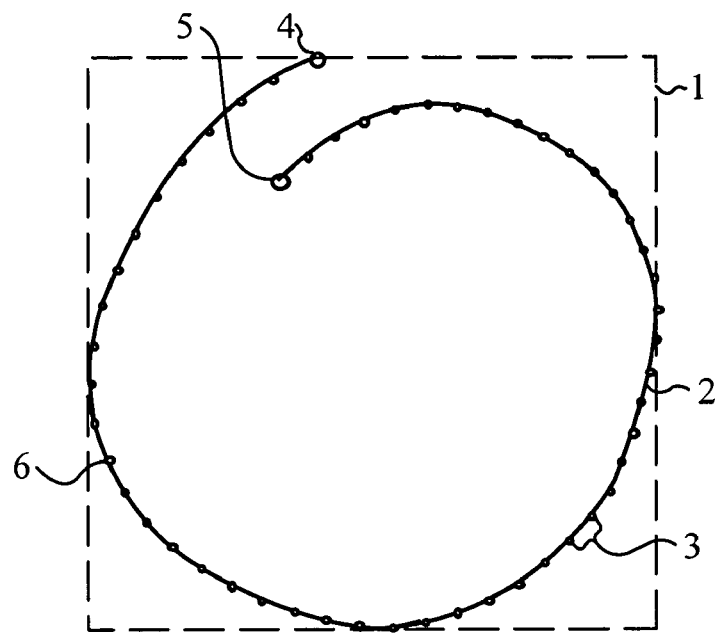
FIG. 1 shows an example of a basic sketch entity with a single initiation event and a single termination event.
Figure 2:
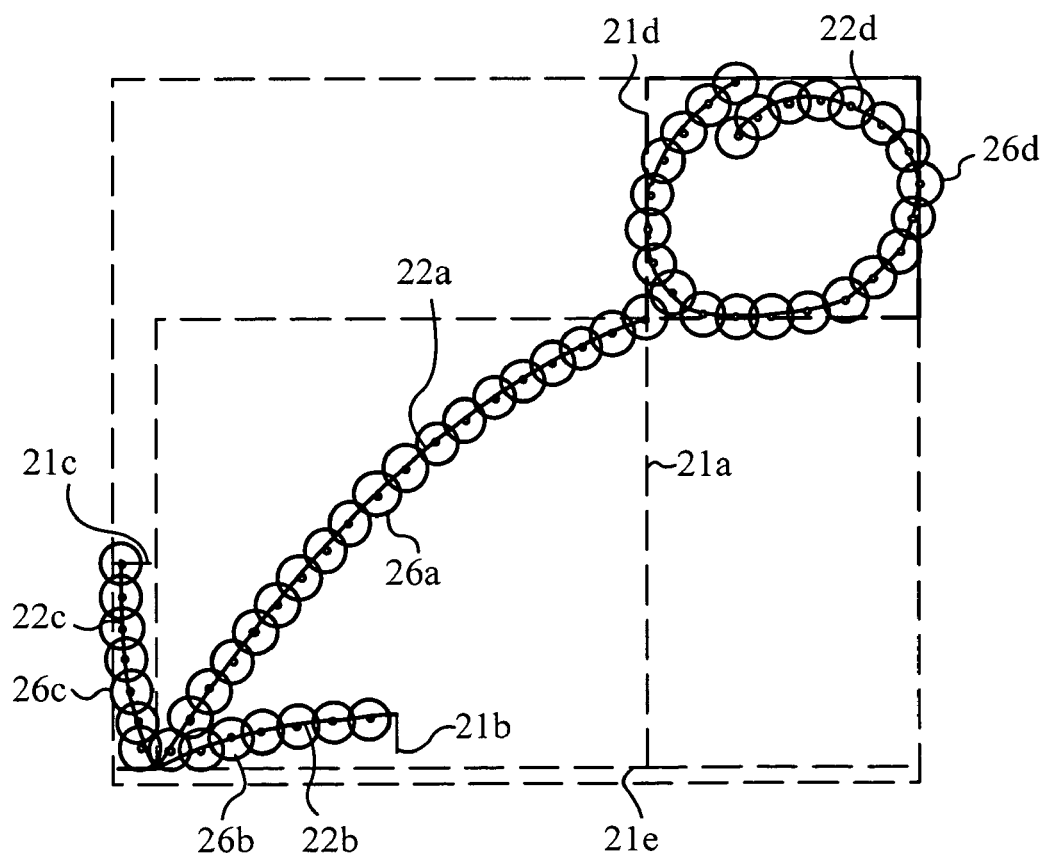
FIG. 2 shows an example of an advanced sketch entity with multiple initiation events and multiple termination events.
Figure 5:
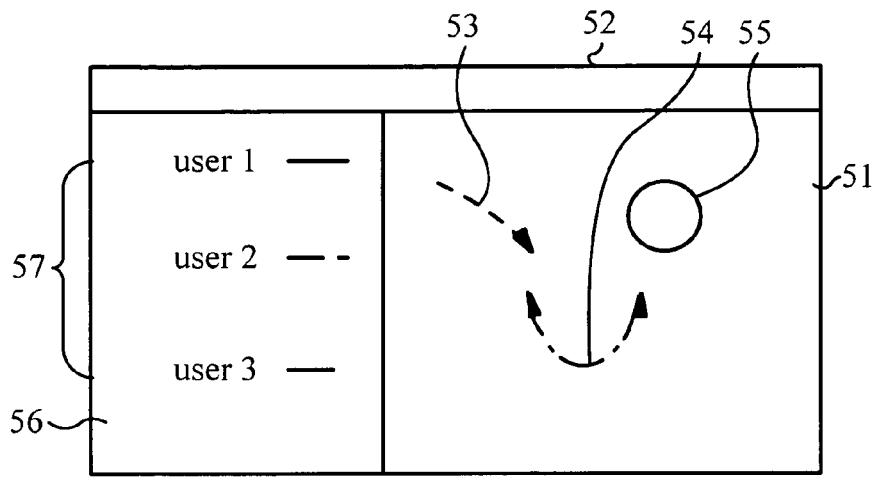
FIG. 5 shows a simplified example of an interactive graphical user interface with sketch entities that are marked and correlated to user identities.
Figure 6:
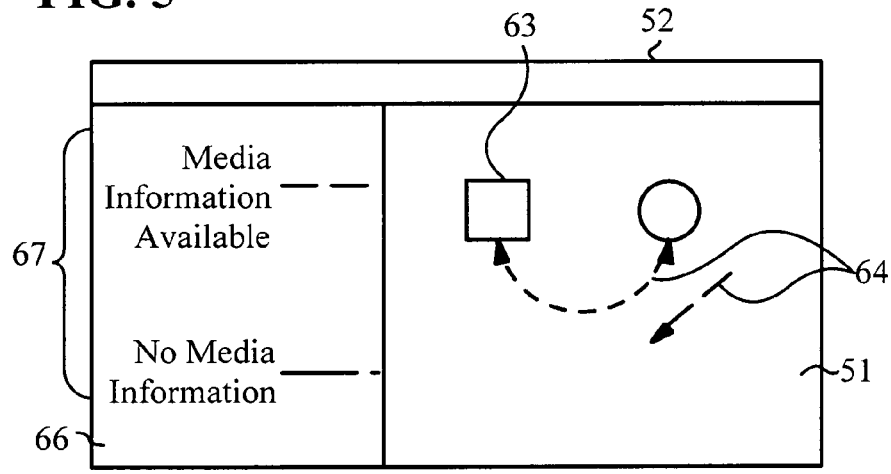
FIG. 6 shows a simplified example of an interactive graphical user interface with sketch entities that are marked to visualize the availability of associated multimodal interaction information.
Figure 7:
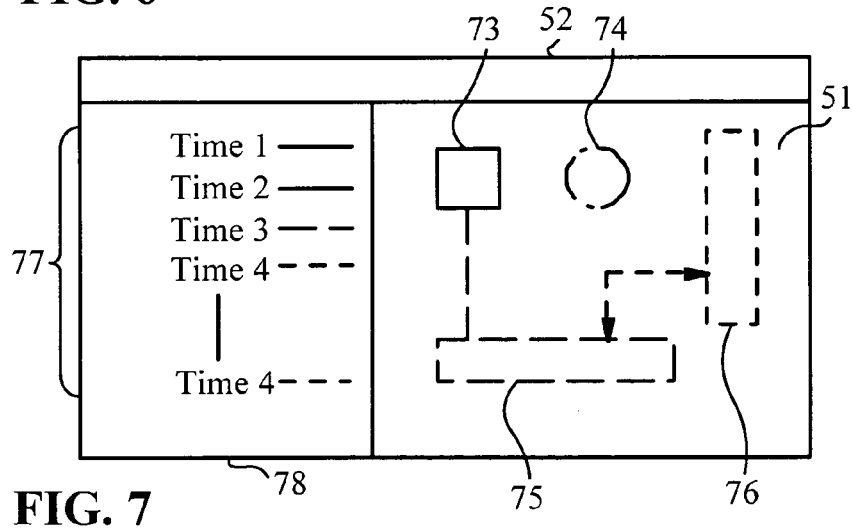
FIG. 7 shows a simplified example of an interactive graphical user interface with sketch entities that are marked to visualize the chronological creation process of the sketch entities.

According to an aspect of the present invention, an interactive graphical user interface such as RECALL™ GUI 52 in FIGS. 5-7 is provided to a number of client machines, e.g., Co11-1N. The RECALL™ GUI 52 has a canvas 51 that allows one or more users, e.g., C11-1N, C21-2N of FIGS. 14-15, to draw or create freehand sketch entities. In the simplest case, a sketch entity consists of a line, which may be straight or curved. A basic sketch entity is created as an independent element of a more complex freehand drawing and/or to annotate, e.g., encircle or underline, a feature of an image displayed in the background of canvas 51. FIGS. 1-2 show exemplary basic and complex sketch entities, respectively. The drawing process is captured in a real time manner such that simultaneously captured multimedia/multimodal interaction information can be precisely correlated.

Figure 3:
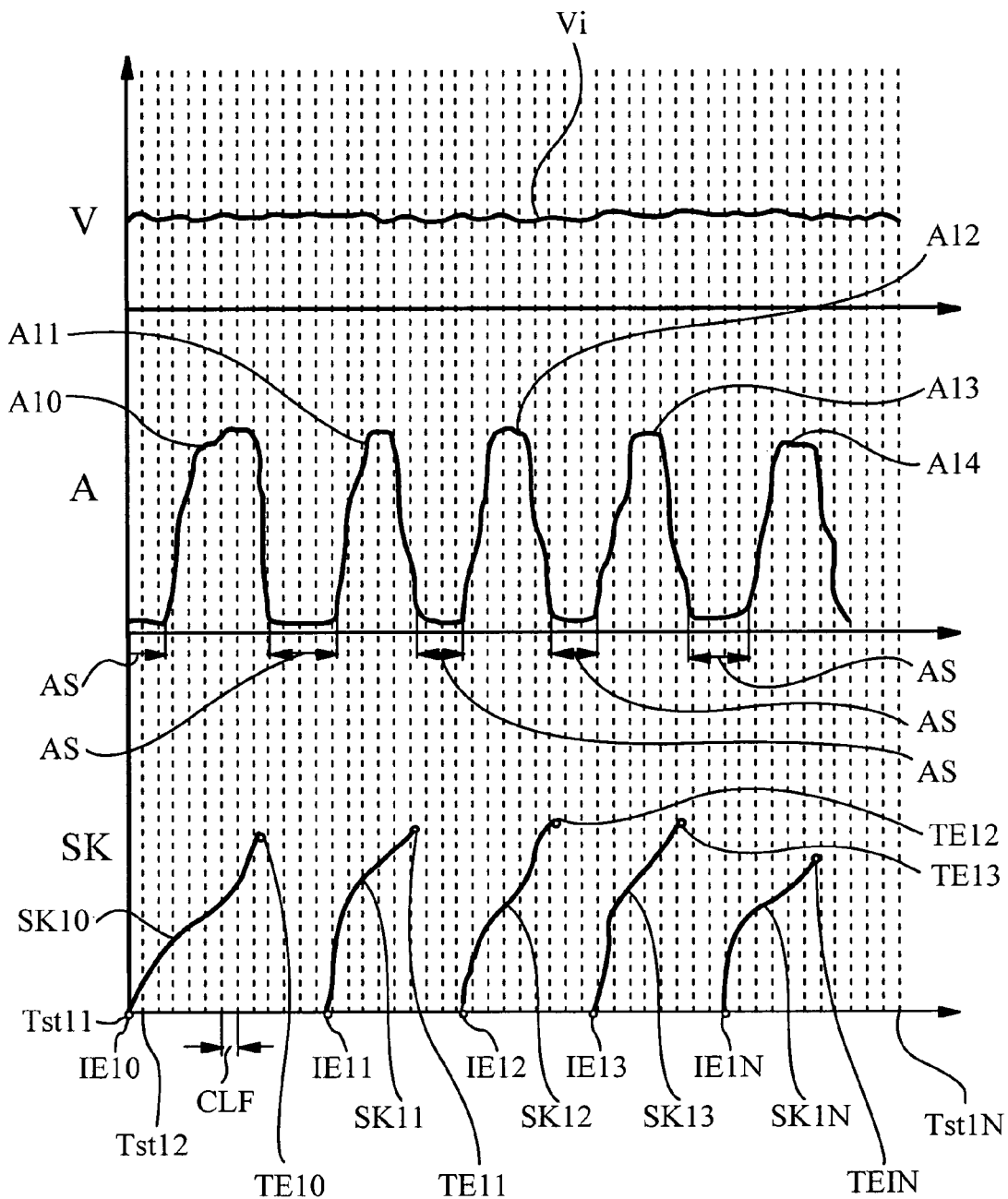
FIG. 3 shows an exemplary graph of a basic procedure to capture sketching activities and associated multimodal interaction information.
Figure 4:
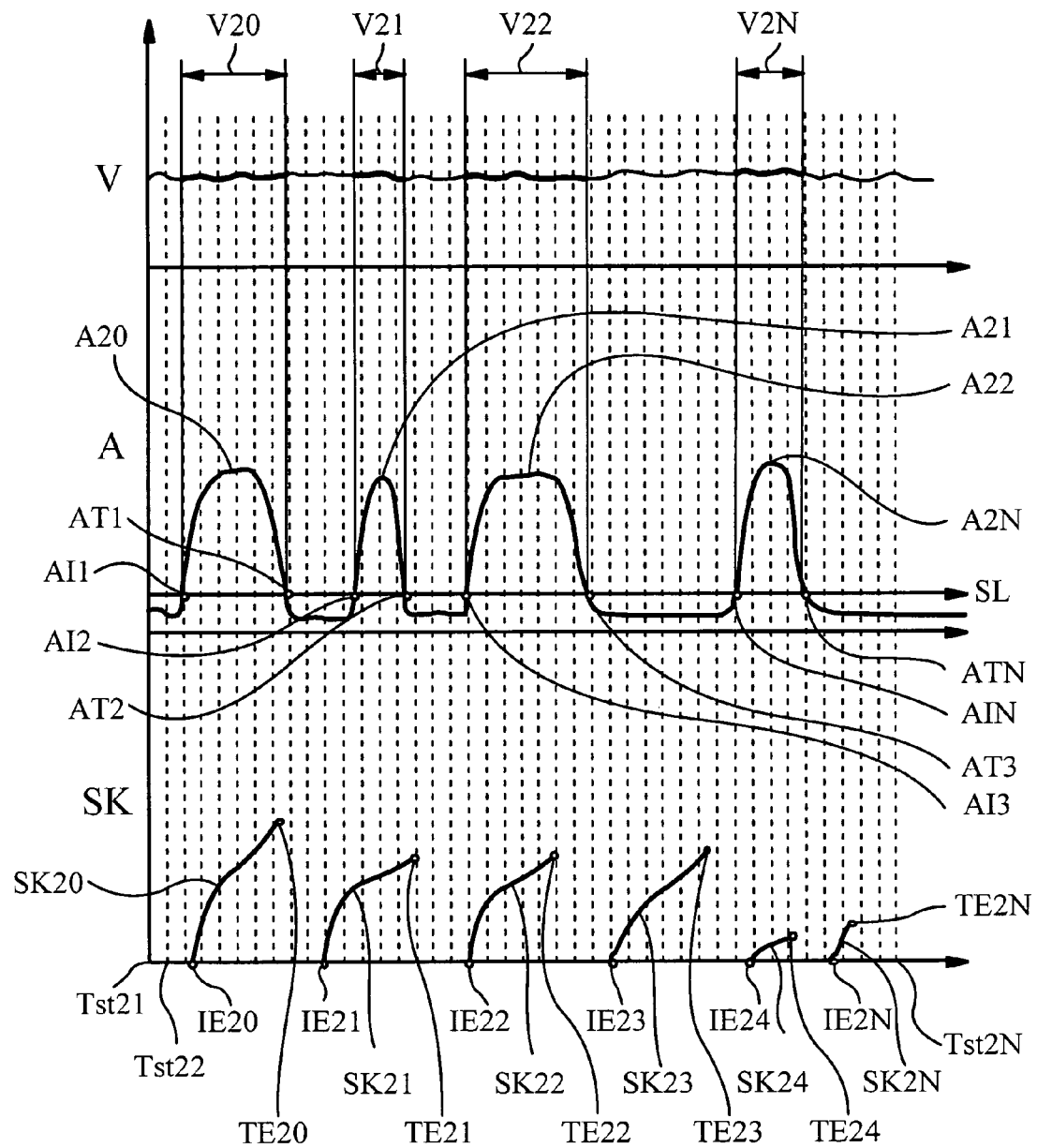
FIG. 4 shows an exemplary graph of an advanced procedure to capture sketching activities and associated multimodal interaction information.

The real time capture of the sketch entity's creation process is enabled by timestamps Tst11-1N, Tst21-2N (see FIGS. 3, 4). Timestamps Tst11-1N, Tst21-2N have a clock frequency CLF (see FIG. 3) that may be defined by a client machine's operating system. Alternatively, CLF may be a parameter uniformly defined for all client machines. The clock frequency CLF is processed as a function of a computer's internal clock and is preferably constant.

The creation process of a sketch entity commences with an initiation event (e.g., IE10-1N of FIG. 3 or IE20-1N of FIG. 4). The initiation event may be triggered by, for instance, the down click of a mouse button at the time, when the cursor is within the canvas or drawing area 51 of the RECALL™ GUI 52 (see FIGS. 5-7). Depending on the hardware used to create the drawing, the initiation event may also be triggered by the contacting of a drawing pin or pen with the surface of a touch screen or an activation click of a specified button of a digitizer board. In other words, the initiation event IE10-1N, IE20-1N may be any interaction of the user with any kind of input device that is feasible to recognize a predetermined initiation command. This applies also to a voice recognition system that is utilized to recognize verbal commands as a means to initiate predetermined functions of the present invention. The voice recognition system may reside in a RECALL™ server or in the client machine.

The creation of the sketch entity is completed when the client triggers a termination event (e.g., TE10-1N of FIG. 3 or TE20-1N of FIG. 4). The termination event may be triggered by, for instance, the release of a depressed mouse button. Depending on the hardware employed, the termination event may also be the removal of a contacting drawing pin or pen from the surface of a touch screen or the selection of a specified button of a digitizer board. In other words, the termination event TE10-1N, TE20-1N may be any interaction of the user with any kind of input device that is feasible to recognize a predetermined termination command. This applies also to a voice recognition system that is utilized to recognize verbal commands as a means to initiate predetermined functions of the present invention. The voice recognition system may reside anywhere accessible by the client machine.

The initiation event and the termination event define the temporal boundary condition to combine a number of drawn line segments into a sketch entity. This definition is applied in a basic and an advanced form with the result of sketch entities with varying complexities.

FIG. 1 shows an example of a basic ketch entity. In correspondence with the initiation event IE10-1N of FIG. 3, the drawing of the curve 2 begins at the initiation point 4 and ends at the termination point 5. The client user's drawing movements are captured in sequence, each corresponding to the clock frequency CLF of the time stamps Tst11-1N of FIG. 3. As a result, a progressive number of points 6 are created and are connected by line segments 3.

After the curve 2 is created, the RECALL™ system analyzes the numeric values of the coordinates of points 6. During this analysis, the extreme values of the x and y coordinates are recognized. These extreme values are utilized by the system to create a boundary as indicated by a dashed box 1. The boundary 1 defines a sketch entity and serves as a dummy object, which is utilized during the creating, editing, viewing and replaying of a RECALL™ session and which is hereinafter interchangeably referred to as a "sketch object".

The clock frequency CLF defines, in combination with the drawing speed, the resolution of the curve 2. In other words, the faster the drawing speed for a given clock frequency CLF the longer the distance between individual points 6. The clock frequency CLF is adjusted to a feasible level that balances the average drawing speed at which client users create the sketch entities with a minimal required curve resolution.

FIG. 2 shows an example of an advanced sketch entity. As illustrated in FIG. 2, the system disclosed herein advantageously provides the possibility of creating advanced sketch entities that consist of a number of combined curves 22a-d. Freehand drawings are typically created with a certain inaccuracy. To allow an automated combining of inaccurately drawn curves 22a-d, the system of the present invention assigns proximity areas 26a-d to the points 6. The proximity areas 26a-d are predetermined areas surrounding the points 6. The aerial extension of the proximity areas 26a-d may be defined in a vector format or a coordinate format.

Proximity areas 26a-d are recognized in correlation to the curves 22a-d. As a result, proximity areas 26a-d that overlap with each other and that do not belong to the same curves 22a-d trigger an automated combining of the correlated curves 22a-d. The size of the proximity areas 26a-d is defined in correlation to the maximal space between the points 6 such that a closed area in the vicinity of the curves 22a-d is covered by the proximity areas 26a-d. The boundary boxes 21a-d may be combined into one boundary box 21e, i.e., one sketch object, or remain as separate and independent dummy objects.

The combining function may be activated as part of the system setup and/or individually by assigning the initiation event to two separate initiation commands. For example, in case of a mouse, down click the right mouse button triggers an initiation event with combining function and down click the left mouse button triggers an initiation event without combining function. As one skilled in the art will appreciate, the dual assignment of initiation commands for initiation events may be applied to any feasible input device, including a voice recognition system.

The system may further provide automated geometric feature recognition to correlate standardized geometric elements to the freehand drawn curves. During the creation of complex freehand drawings, which may consist of a number of basic and/or advanced sketch entities, it is desirable to replace inaccurate geometric elements with computer generated accurate geometric elements. A computer generated accurate geometric element may for instance be:

1) a straight line replacing a curve within a predetermined maximal curvature;
2) a horizontal line replacing a curves within a predetermined maximal aberration, deviating in y-direction relative to the initiation point;
3) a vertical line replacing a curve within a predetermined maximal aberration, deviating in x-direction relative to the initiation point; or
4) an arc replacing a curve within a predetermined maximal curvature aberration over its length.

The automated geometric feature recognition may be extended to recognize any free hand drawn geometric form and replace it with computer generated accurate geometric elements.

The automated feature recognition may be activated during the setup of the system or it may be independently activated with a feature recognition command. The feature recognition command can be incorporated, for instance, as the handling variation of the input device. In case of a mouse as the input device, the handling variation may be a single down click for an initiation command without feature recognition and a double click for an initiation command including feature recognition.

During the creation of basic and/or advanced sketch entities, associated multimedia information can be captured in addition to the sketching activities. For example, FIGS. 3-4 show that video signal, audio signals, and sketch activities are captured simultaneously in a RECALL™ session.

In FIG. 3, the top vertical axis V corresponds to the signal density of the video signal Vi, the middle vertical axis A corresponds to the acoustic level of the audio signals A10-1N, and the bottom vertical axis SK corresponds to the drawing path during the creation of the curves 2. Hence, the incline angle of the sketch activities SK10-1N corresponds to the drawing speed at which curve 2 is created. The horizontal axis of the top, middle and bottom section represent the elapsed time. That is, the vertical raster lines that cover the top, middle and bottom section represent the time stamps Tst11-1N. The spacing between the vertical raster lines represents the clock frequency CLF.

In the creation and/or editing mode, the system continuously captures audio and video signals in addition to the sketching activities. The system assigns the timestamps Tst11-1N to the sketching activities and simultaneously to the captured audio and video. The audio signals A10-1N may be interrupted by silence periods AS. In some embodiments, the audio signals A10-1N represent verbal information provided by the users, in which case, silence periods AS separate blocks of coherent verbal information.

The video signal Vi may be a consistent stream of video data that correspond in size and structure to the image resolution, the color mode, the compression ratio and the frames per time unit. The video signal may be a sequence of still images at a rate that the still images are recognized as still images or that they combine in a viewer's mind to a continuous flow.

In addition to the creation/editing mode, the system of the present invention provides a replay mode and a viewing mode. In the replay mode, a selected document can be replayed such that the individual sketch entities are automatically recreated in the drawing area or canvas 51. The automatic recreation, i.e., replay, is performed in a chronological manner. The corresponding audio signals A10-1N and video signal Vi are replayed synchronously together with the replay of individual sketch entities.

In the viewing mode, a selected RECALL™ session document can be displayed with all sketch entities. A user may select one of the sketch entities displayed to begin replay. Alternatively, the user may select two or more individual sketch entities. In this case, a replay initiation routine analyzes all timestamps Tst11-1N correlated to the selected sketch entities and determines the earliest one. The detected earliest time stamp is taken by the system to define a common starting moment for the video signal Vi and for the audio signals A10-1N respectively the silence periods AS. The system continuously provides the correlated audio and video data until the user makes the next selection of one or more sketch entities. At that moment, the replay initiation routine is initiated again. Optionally, the audio and video can be turned off, paused, or terminated by any feasible means.

The selection process is defined by the system preferably in a form of a selection rectangle. The selection rectangle is to be created by the user by indicating two diagonal selection points within the drawing area 51, also known as drag-select. The selection rectangle selects the sketch entities by surrounding and/or intersecting with their correlated dummy objects defined by the corresponding boundary boxes described before.

In some embodiments, the selection process is performed by initiating a selection command when the cursor is placed by the user/client within one of a plurality of proximity areas. By doing so, the client user is able to distinctively select singular sketch entities. This is particularly useful when there are high densities of individual sketch entities within the drawing area 51.

FIG. 4 illustrates an advanced procedure captures sketch activities and associated media information to provide confined media information correlated to one or more selected sketch entities. Elements of FIG. 4 mainly correspond to those of FIG. 3. For example, timestamps Tst21-2N are comparable to timestamps Tst11-1N, initiation events IE20-2N are comparable to initiation events IE10-1N, termination events TE20-2N are comparable to termination events TE10-1N, audio signals A20-2N are comparable to audio signals A10-1N, sketch activity paths SK20-2N are comparable to sketch activities SK10-1N, etc. FIG. 4 introduces an audio switching level shown in the middle section with the horizontal line SL.

Block elements of media information are provided during the advanced procedure by recognizing only audio signals A20-2N that are above the audio switching level SL. During the creation of the sketch entities, the system captures audio signals A20-2N between the audio initiation moments AI1-N and the audio termination moments AT1-N, respectively.

The audio initiation moments AI1-N and the audio termination moments AT1-N preferably share the same switching level. Alternatively, the audio initiation moments AI1-N and the audio termination moments AT1-N are triggered at different switching levels.

In an audio assigning procedure, the system assigns the audio initiation moments AI1-N and the audio termination moments AT1-N to the closest of the time stamps Tst21-2N. These times stamps Tst21-2N are utilized to cut the corresponding video sequences V20-2N out of the video signal Vi and to assign them to the correlated audio signals A20-2N.

The creation of sketch entities during the advanced procedure with reference to FIG. 4 is comparable to the creation of sketch entities during the basic procedure as described before with reference to FIG. 3

After the multimedia blocks are created, the system performs a block assigning procedure to assign the multimedia blocks to the correlated sketch entity in dependence on their time relation. Time relations include, for instance:

1) the sketch entity fully overlapping a multimedia block;
2) the multimedia block fully overlapping a sketch entity;
3) the initiation event IE20 following the audio initiation moment AI1 and the termination event TE20 following the audio termination moment AT1;
4) the audio initiation moment AI3 following the initiation event IE22 and the audio termination moment AT3 following the termination event TE22; and
5) the initiation event IE24, IE2N and/or the termination event TE24, T2N being below a minimal time span respectively below a minimal number of time stamps to the audio initiation moment AIN and/or the audio termination moment ATN.

The audio assigning procedure and the block assigning procedure may be performed with an approximation algorithm provided by the system either simultaneously at the time the creation mode respectively the editing mode is activated, or after the creation mode respectively the editing mode is terminated.

During the viewing mode, the advanced procedure allows the user or users to selectively review the multimedia blocks correlated to the selected sketch entity. The system provides the user with an optional predetermined audio and/or video signature to inform him/her at the end of the correlated multimedia block. Hence, the advanced procedure prevents the user from accidentally or unnecessarily seeing or hearing multimedia information unrelated to the selected sketch entity, avoiding information overload.

To provide the user with additional administrative information, the system optionally displays the individual sketch elements in varying styles. The administrative information includes, for instance:

1) user identification correlated to individual sketch entities of a collaboratively created document;
2) information about available multimedia blocks for individual sketch entities contained in a document; and
3) chronological creation of the sketch entities contained in a document.

FIGS. 5, 6 and 7 illustrate graphical coding of sketch entities described above and exemplify the interactive graphical user interface 52.

In FIG. 5, the sketch entities 53, 54, 55 are shown with first graphical codes to mark them according to their creator's user (client) identification. In the example of FIG. 5, the graphical codes are varying line fonts. Graphical codes may be of any color, shape, symbolic contents and/or dynamic respectively static luminescence variations. In an optional first window 56, a list 57 of collaborating clients/participating users is displayed together with the assigned graphical codes.

In FIG. 6, the sketch entities 63 and 64 are shown with second graphical codes to mark them in case multimedia blocks are available. In the example of FIG. 6, the graphical codes are varying line fonts. Graphical codes may be of any color, shape, symbolic contents and/or dynamic respectively static luminescence variations. In an optional second window 66, a nomenclature 67 is displayed together with the assigned graphical codes. The second graphical codes may also be applied during the viewing mode to dynamically highlight the sketch entity, whose multimedia block is replayed.

In FIG. 7, the sketch entities 73-76 are shown with third graphical codes to mark them according to their creation chronology. In the example of FIG. 7, the graphical codes are varying line fonts. Graphical codes may be of any color, shape, symbolic contents and/or dynamic respectively static luminescence variations. In an optional third window 78, a nomenclature 77 of the sketch entities is displayed together with the chronologically applied third graphical codes. The third graphical codes may be preferably designed with a fluent transition such that the chronology of the creation process can be easily recognized. Fluent transitions include, for instance:

1) the graduate change in the colors corresponding to the color spectrum; and
2) the continuous dilution of dotted lines.

The system accepts and/or provides a variety of background images that may be displayed in the create/edit/view/replay area/window/frame/canvas 51. Background images may be imported at the beginning and/or at any time during the creation of a new document, i.e., they may be laid behind an existing creation of sketch entities. Background images are preferably pictographic images like, for instance:

1) photographs;
2) scans of graphics and/or blueprints;
3) scans of text;
4) snapshots of videos;
5) computer assisted drawings (CAD); or
6) other computer-generated graphics or images.

Alternatively, the system may advantageously utilize the client computer's video capturing capability to retrieve snapshots of the displayed video and to provide the snapshots as background images. The snapshot retrieval function is preferably activated during the creation mode. The snapshot is taken with a snapshot capturing command issued by a client user during the real time display of the displayed video. A snapshot capturing command may be, for instance, a mouse click at the moment the cursor is placed within the video display screen, e.g., 59A, although various implementations are possible.

The snapshot retrieval function allows multiple users C11-1N, C21-2N to comment a captured video essentially simultaneously in real time. Hence, the snapshot retrieval function is particularly feasible to combine a live visual experience with a documentation procedure. Applications for the snapshot retrieval function are numerous, for instance, inspection of construction sites.

FIGS. 5-7 further show the optional video display screen 59A and the optional audio control screen 59B. Video display screen 59A and the audio control screen 59B are conventionally provided by the client machine's operating system. Alternatively, the video display screen 59A and/or the audio control screen 59B may also be provided by the RECALL™ system. Although screens 59A and 59B can be respectively integrated into the RECALL™ GUI 52 as separate frames or windows with independent control functions, as will be described later with reference to FIG. 10, the RECALL™ system preferably embeds a media player capable of recording and controlling audio playback (e.g., play, pause, stop, forward, reverse, etc.).

Figure 8:
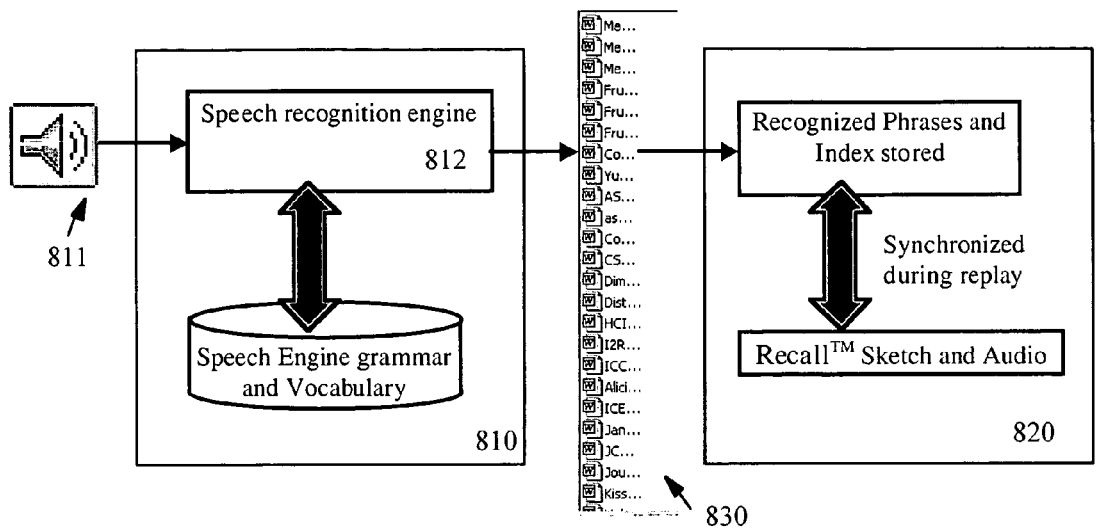
FIG. 8 shows design objectives of the recognition module and the V2TS replay module.

Referring to FIG. 8, the RECALL™ system comprises the following modules:

1. Recognition module 810—recognizes words or phrases from an audio file 811 created during a RECALL™ session and stores the recognized occurrences and corresponding timestamps in text format 830. The recognition module includes a V2T engine 812 that takes the voice/audio file 811 and runs it through a voice to text (V2T) transformation. The V2T engine 812 can be a standard speech recognition software package with grammar and vocabulary, e.g., Naturally Speaking, Via Voice, MS Speech recognition engine. The recognition module 810 is further explained below with reference to FIG. 9.

2. V2TS replay module 820—presents the recognized words and phrases and text in sync with the captured sketch and audio/video, thus enabling a real-time, streamed, and synchronized replay of the session, including the drawing movements and the audio stream/voice. The V2Ts replay module 820 is further explained below with reference to FIGS. 10-12.

Recognition Module

For the purpose of demonstrating an implementation of the present invention, the recognition module integrates a standard speech recognition engine and speech recognition software development kit (SDK). In a specific example, the recognition module utilizes the NaturallySpeaking® engine and the NaturallySpeaking SDK from Dragon System, Inc., and the Microsft® Speech SDK in VC++. One skilled in the art will appreciate that any standard speech recognition engine and speech recognition SDK can be implemented. For effective recognition, the integrated V2T engine should have some trained user profiles for different speakers.

Figure 9:
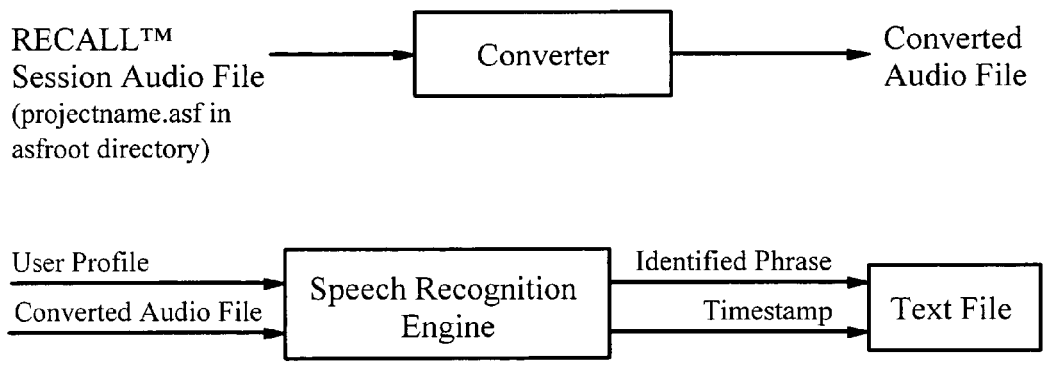
FIG. 9 is a flow diagram of the recognition module according to the present invention.

Referring to FIG. 9, the recognition module takes as input the project name of the RECALL™ session and the user whose data it should use to perform the recognition. Next, the recognition module converts the audio file corresponding to the project, e.g., projectname.asf, into a format recognizable to the V2T engine.

The V2T engine is initialized with the user profile and the converted audio file and starts transcribing thereafter. A Notify sink is created to receive notifications about events. Every time the engine identifies a phrase, it records the phrase and a timestamp in a text file, e.g., <projectname>sp.txt, under a designated directory, e.g., <projectname> directory. At the end it records the start and end of file timestamps. All timestamps are in bytes that the sound card processed by the time this event happened.

V2TS Replay Module

A. Timestamp Conversion

To achieve synchronization, all the different streams of data should be played in a manner that minimizes the discrepancy between the times at which concurrent events in each of the streams occurred. Thus, the timestamp information for all the streams is first translated into a common time base. The absolute system clock timestamp, with the time instant when a RECALL™ session starts set to zero, serves as the common time base. Each sketch object is encoded with the system clock timestamp during the session production phase.

To convert each sketch object's timestamp into the common time base, the V2TS replay module subtracts the system clock timestamp for the instant the session starts, i.e., sketch object timestamp=raw sketch object timestamp−session start timestamp.

To convert the audio system time coordinates, the V2TS replay module multiplies the system clock timestamp obtained from the audio player, e.g., Netshow Encoder/Windows Media Player, and converts it into milliseconds. This gives the common base timestamp for the audio, i.e., audio timestamp=raw audio timestamp*1000.

The conversion mechanism for the transcribed data uses a slightly more involved algorithm and is a distinguishing component of the RECALL™ system. As describe before, the RECALL™ session start and end timestamps are stored in byte format for the transcribed data by the recognition module, or more specifically, by the V2T engine while processing the captured audio data. On the other hand, the RECALL™ session start and end times are stored in system clock format during the production phase of the session. Thus, for a recognized word/phrase of the transcribed data, the corresponding system clock time can be found by scaling the raw byte data by a factor that is determined by the ratio of the time duration of the session in system clock and the time duration in bytes. That is, transcribed data timestamp=$(Tr*Ds/Dr)+Tsst$, where Tr=raw transcribed data timestamp−raw start time
Ds=system clock session end time−system clock session start time
Dr=raw end time−raw start time
Tsst=system clock applet start time.

The Tsst term is later subtracted from the calculated value to obtain the common base timestamp.

Based on the above-described functionalities, a keyword search is implemented to identify all the keyword instances in a particular session, i.e., keyword timestamp=system clock keyword timestamp−session start timestamp.

The keyword search functionality is explained in more detail later with reference to FIG. 10.

B. Programming Language and Data Structure

In an embodiment, the programming for the synchronized replay of the RECALL™ session is done in Java 1.3. Important Java classes and data structures are listed below.
1. Replay Applet: The main program controlling the replay session through a hypertext markup language (HTML) file.
2. Storage Table: The table storing all the sketch objects for a single RECALL™ page.
3. TextIndex: The array storing all the recognized phrases in the session.
4. ReplayFrame: The frame on which sketches are displayed.
5. TextReplayFrame : The frame on which recognized phrases are displayed.
6. ReplayControl: The thread coordinating audio and sketch.
7. TextReplayControl: The thread coordinating text display with audio and sketch.
8. RecallObject: The data structure incorporating information about a single sketch object.
9. Phrase: The data structure incorporating information about a single recognized phrase.

In an embodiment, the RECALL™ system may include a RECALL™ working directory containing the following files:
1. Projectname_x.html: The HTML file to display page x of a RECALL™ session;
2. Projectname_x.mmr: The data file storing the storage table for page x of the session, generated in the production phase thereof; and
3. Projectnamesp.txt: The data file storing the recognized phrases for the entire RECALL™ session, generated from the recognition module.

The RECALL™ system may further include an audio file directory, <asfroot>, containing the audio file, projectname.asf, for the entire session.

C. Synchronization and Replay Scenarios

In an embodiment, the entire RECALL™ session is represented as a series of thumbnails for each new page in the session. One can browse through the series of thumbnails and select a desired page for replay. Below describes with details of implementation a scenario 1000 where a particular page is selected for replay.

Figure 10:
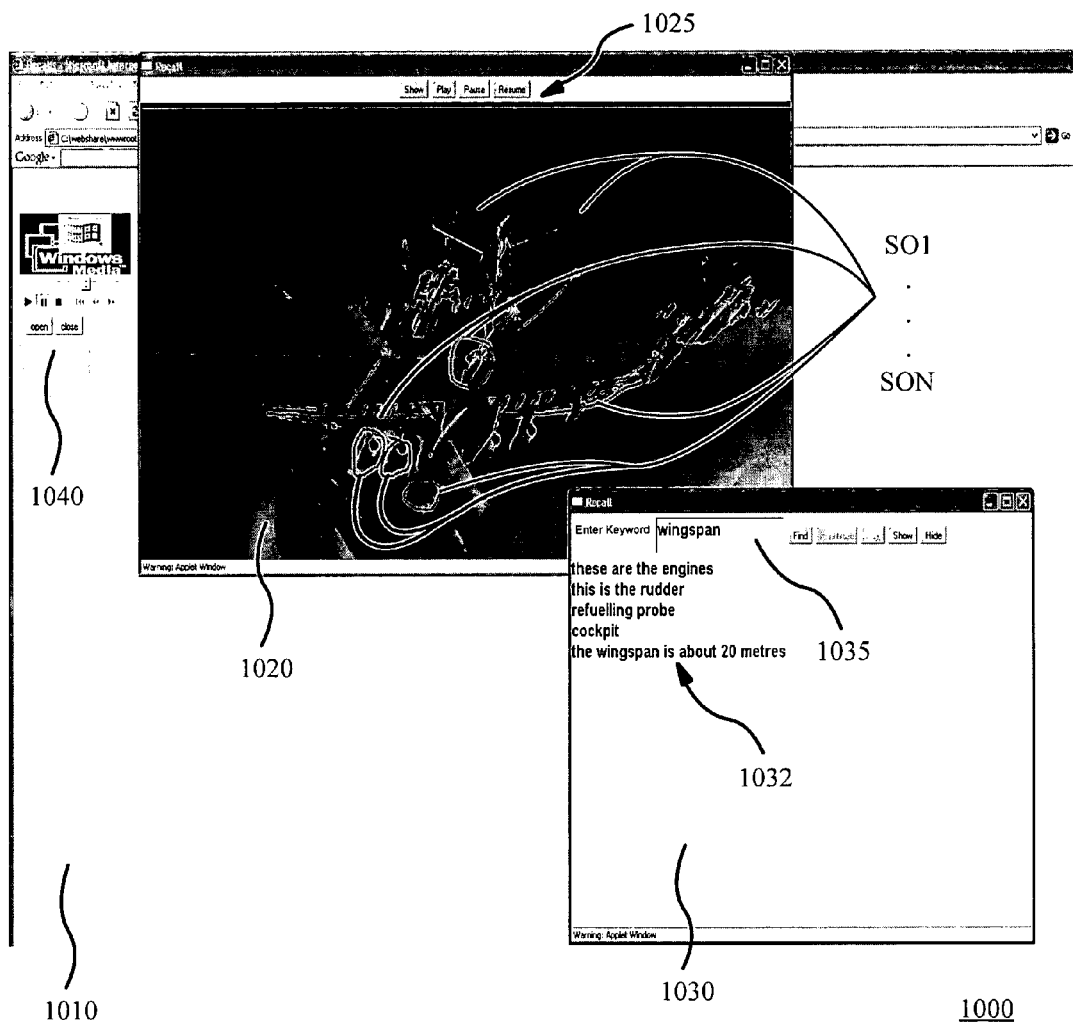
FIG. 10 is a snapshot of an exemplary interactive graphical user interface with an embedded media player for synchronized audio replay, a replay frame showing a background image annotated with sketch entities, a keyword search facility, and a text replay frame showing the synchronized audio replay in text format.

Referring to FIG. 10, a particular RECALL™ session page is presented as a webpage 1010 with the Replay Applet running in the background. When the applet is started, it instantiates the media player 1040 with a link to the audio file to be loaded and the time to start from for that particular page. It also opens up a ReplayFrame 1020 which will display all the sketches SO1-SON made during the session and a TextReplayFrame 1030 which will display all the recognized keywords 1032 spoken during the session.

As illustrated in FIG. 10, the keyword search functionality enables a user to search/select a keyword "wingspan" via an input box 1035. The session then begins to replay in the ReplayFrame 1020 from the point when the latest sketch object was drawn before the corresponding keyword "wingspan" was spoken. The ReplayFrame 1020 may have several functionality buttons 1025, e.g., show, play, pause, resume, etc. The captured sketches or sketch objects SO1-SON are replayed in sync with the associated audio signals captured essentially simultaneously therewith. Transcribed text corresponding to the audio can also be synchronously replayed in the TextReplayFrame 1030.

Figure 11:
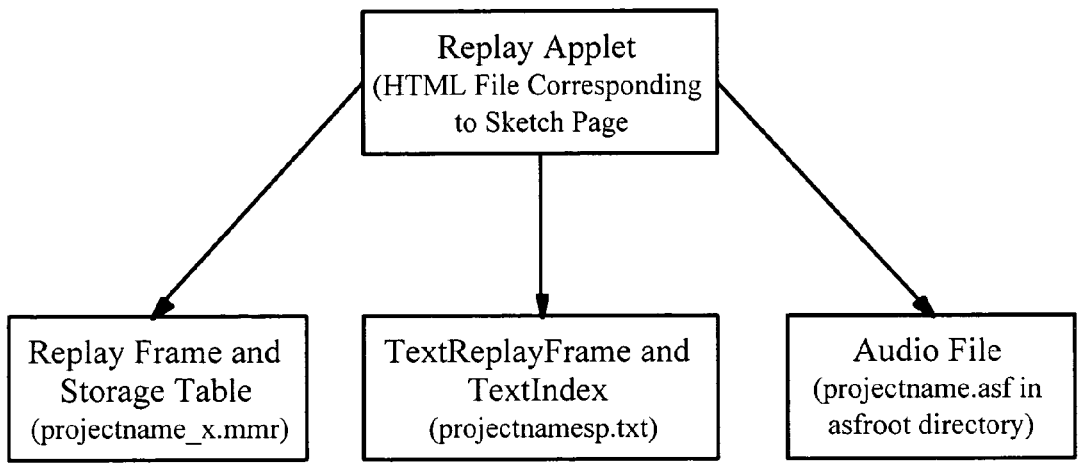
FIG. 11 diagrammatically shows the V2TS replay module hierarchy.

The V2TS replay module hierarchy is illustrated in FIG. 11. In addition to the ReplayFrame 1020 and the TextReplayFrame 1030, the applet also reads in the RECALL™ data file (projectname_x.mmr) into a Storage Table and the recognized phrases file (projectnamesp.txt) into a TextIndex Object. TextIndex is basically a vector of Phrase objects with each phrase corresponding to a recognized phrase in the text file along with the start times and end times of the session in bytes as well as absolute time format to be used for time conversion.

When reading in a Phrase, the initialization algorithm also finds the corresponding page, the number and time of the nearest sketch object that was sketched just before the phrase was spoken and stores it as a part of the information encoded in the Phrase data structure. For this purpose, it uses the timestamp conversion algorithm as described above. This information is also used by the keyword search functionality.

Now we have an active audio file, a table with all the sketch objects and corresponding timestamps and page numbers, and a vector of recognized phrases with corresponding timestamps, nearest object number and page number.

Figure 12:
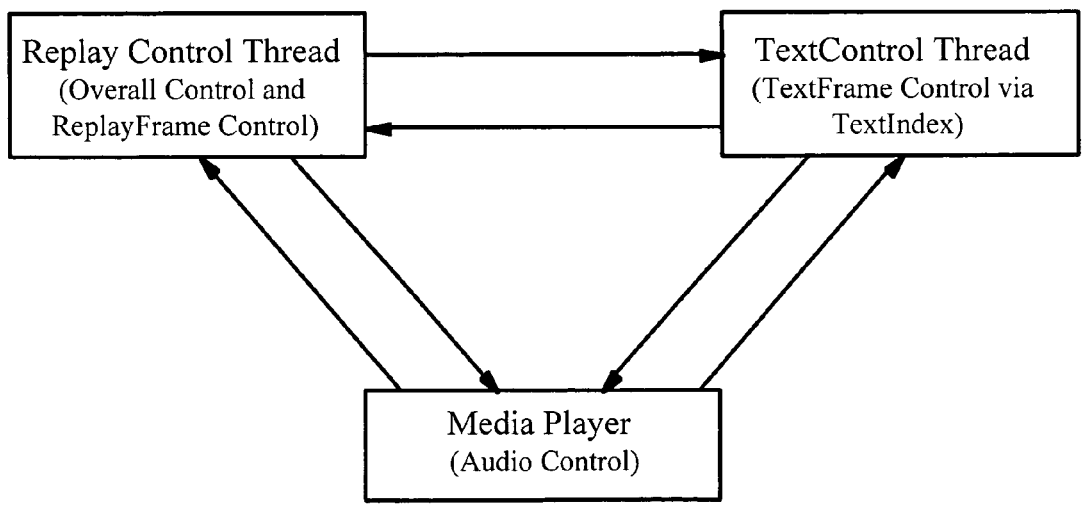
FIG. 12 diagrammatically shows the V2TS replay module control flow.

In the V2TS replay module, multiple threads control the simultaneous synchronized replay of audio, sketches, and transcribed keywords. More specifically, the ReplayControl thread controls the drawing of the sketch and the TextControl thread controls the display of the keywords. FIG. 12 illustrates the V2TS replay module control flow according to an aspect of the present invention.

The ReplayControl thread keeps polling the audio player 1040 for the audio timestamp at equal time intervals. This audio timestamp is converted to the common time base as described before. Then, the table of sketch objects SO1-SON is parsed, their system clock coordinates converted to the common base timestamp and compared with the audio common base timestamp. If the sketch object occurred before the current audio timestamp, it is drawn onto the ReplayFrame 1020. The ReplayControl thread repeatedly polls the audio player 1040 for timestamps and updates the sketch objects SO1-SON on the ReplayFrame 1020 on the basis of the received timestamp.

The ReplayControl thread also calls the TextControl thread to perform this same comparison with the audio timestamp. The TextControl thread parses through the list of keywords in the TextIndex and translates the raw timestamp to common base timestamp and then compares it to the audio timestamp. If the keyword timestamp is lower, the keyword is displayed in the TextReplayFrame 1030.

The latest keyword and the latest sketch object drawn are stored so that parsing and redrawing all the previously occurring keywords is not required. As such, only new objects and keywords need to be processed. This process is repeated until all sketch objects are drawn.

D. Keyword Search and Selection Facility

The V2TS replay module also includes a keyword search and selection facility so a particular keyword in the transcription can be searched. The session can then be synchronously replayed from the time when the word was spoken.

According to an aspect of the invention, when a keyword is entered, e.g., via the input box 1035 in the TextReplayFrame 1030, the system parses through the list of recognized keywords and phrases in TextIndex to identify the selected keyword. If the system is able to find a hit, it retrieves the concerned keyword's page number, nearest sketch object number and sketch object time that was stored when the Phrase corresponding to the keyword was being initialized. Currently, the first hit is considered in cases where there are multiple hits.

The V2TS replay module then resets the ReplayFrame to reference the mmr file corresponding to the particular page number. It also resets the TextReplayFrame, ReplayControl and TextControl accordingly to begin sketching and text display from that retrieved object number, onwards also adjust the audio player position to the timestamp of the latest sketch object.

As one skilled in the art will appreciate, it is within the scope of the present invention to implement the V2TS replay module so that it jumps directly to the instant when the keyword was spoken. However, setting the session to begin replay from the latest sketch drawn before the keyword was spoken provides the user with more context in which the keyword was used.

On the other hand, the V2TS replay module also enables the user to select an item in the sketch and replay from there. More specifically, when a sketch object is selected as the starting point for replay, the V2TS replay module starts playing from the selected object and also adjusts the audio player to start playing corresponding audio from that time. This is described in more detail in the above-referenced co-pending U.S. patent application, now allowed.

In essence, the present invention enables a user to decide and select when, how much, and what captured content rich multimedia information is replayed. To begin replaying the session, the user can select a sketch object or a keyword. The session starts replaying from the selected sketch object or the latest sketch object corresponding to the selected keyword. The sketch objects are re-drawn on an interactive graphical user interface in real time in sync with the audio player, that start playing the voice stream from that time, and with the text replay, that prints in the text window what is said. With the synchronized text replay, the present invention can be surprisingly effective for scenarios involving, for instance, (1) a very noisy environment, or (2) hearing impaired users.

Figure 13:
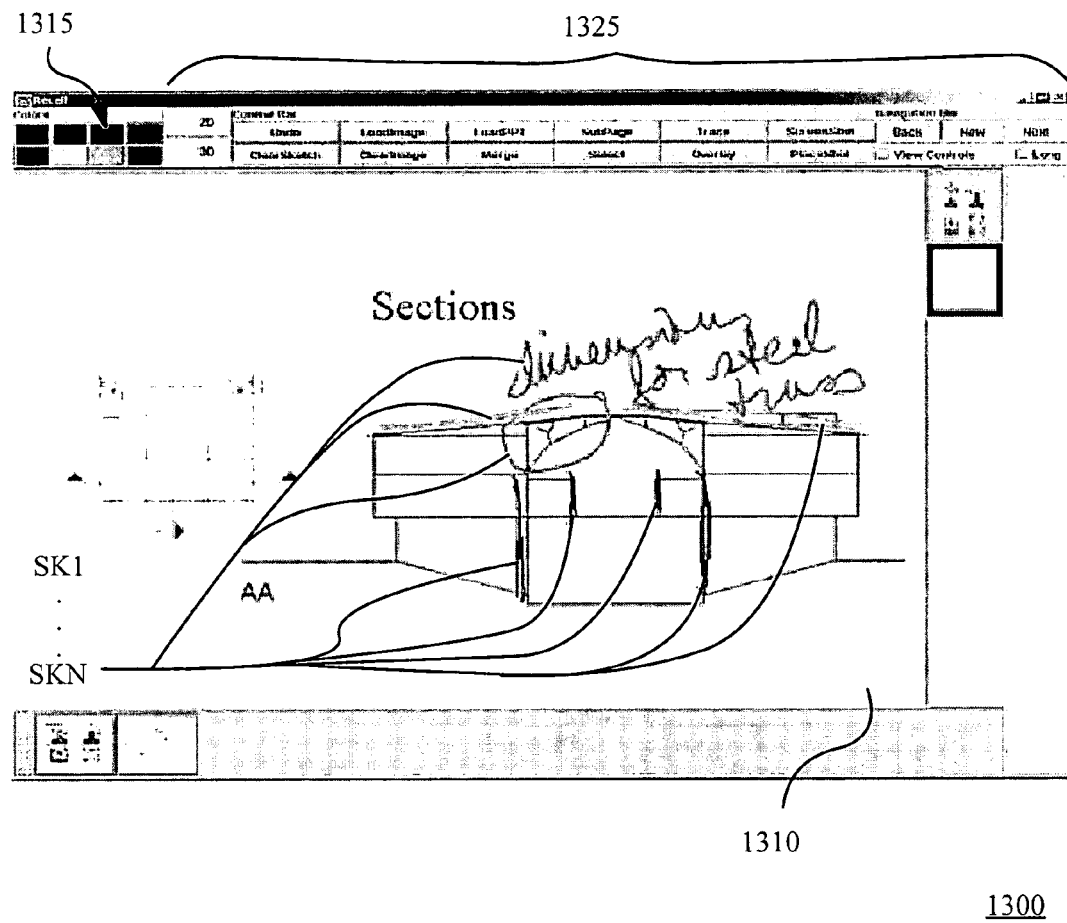
FIG. 13 is a snapshot of another exemplary interactive graphical user interface with enhanced functionalities, a color pallet, and a canvas showing an imported CAD image and sketch objects annotating the CAD image.

FIG. 13 is a snapshot of an exemplary interactive RECALL™ GUI 1300 having a color pallet 1315, a plurality of functionality buttons 1325, and a canvas or drawing area 1310 onto which a user can sketch free hand drawings or writings. In this example, a 2D CAD object is imported as a background image on the canvas 1310. The user annotates the imported image with sketch objects SK1-SKN.

Several functionalities of the RECALL™ GUI 1300 are described below. One skilled in the programming art should have no problem implementing or adding other functionalities.

1. Undo: removes the last sketched object from the canvas.
2. ClearSketch: removes all objects sketched on the current canvas. ClearSketch does not remove the background image from the canvas.
3. LoadImage: allows the user to load a background image onto the canvas. Upon selection, it opens a file dialog box to allow the user to retrieve any desired image.
4. ClearImage: removes the background image in the current canvas. The sketched objects remain untouched.
5. LoadPPT: allows the user to load a Microsoft® PowerPoint® presentation. Upon selection, it opens a file dialog box to allow the user to choose a presentation. The slides of the chosen presentation are displayed on a new window in the form of, e.g., thumbnail images, and may be chosen as backgrounds on the canvas for further mark-up and annotation.
6. 2D and 3D: respectively places a 2 dimensional and a 3 dimensional grid on the canvas to assist the user sketching.
7. SubPage: stores the current canvas as an adjunct to the current page the user is working on. Contents of a subpage can be imported onto the canvas using Merge or Select functionalities described below, thus emulating the multiple tracing papers metaphor familiar to designers.
8. Merge: allows the user to import sketched objects stored as subpages. The merge functionality is toggled on and off with the selection of the merge button. For example, a first click on the merge button activates the merge functionality. Thereafter, selecting any subpage icon would cause its sketched objects to be imported onto the canvas. A second click on the merge button deactivates it.
9. Select: allows the user to import the sketched objects of any one subpage onto the canvas. The subpage is selected by selecting, e.g., clicking, its icon.
10. Trace and Overlay: the Trace and Overlay functionalities work in tandem. On selecting/clicking the trace button, the trace mode is activated, again emulating the tracing metaphor familiar to CAD/graphic designers or technical drawing specialists. Any sketched object now drawn on the canvas is saved by the system in a buffer. The trace mode is deactivated by toggling/clicking on the trace button again. The Overlay functionality is used to place the contents of the buffer onto the current canvas.
11. Screenshot and Placeshot: The Screenshot functionality takes a picture of the current screen content. The Placeshot functionality places that picture on the current canvas as background.

Figure 14A:
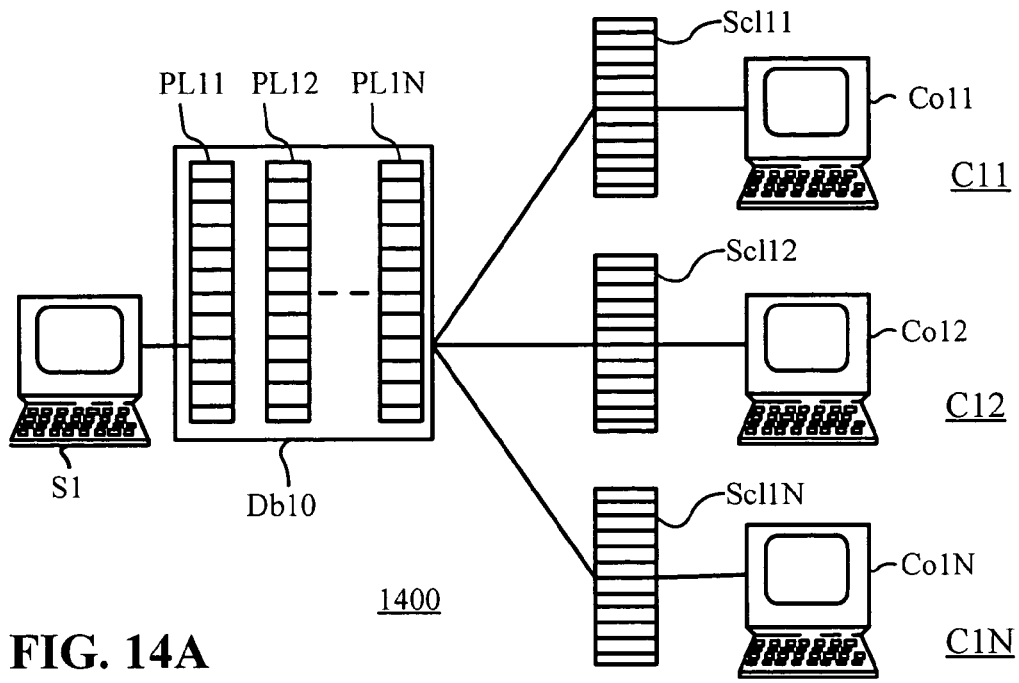
FIG. 14A shows a simplified centralistic distribution system architecture.
Figure 15:
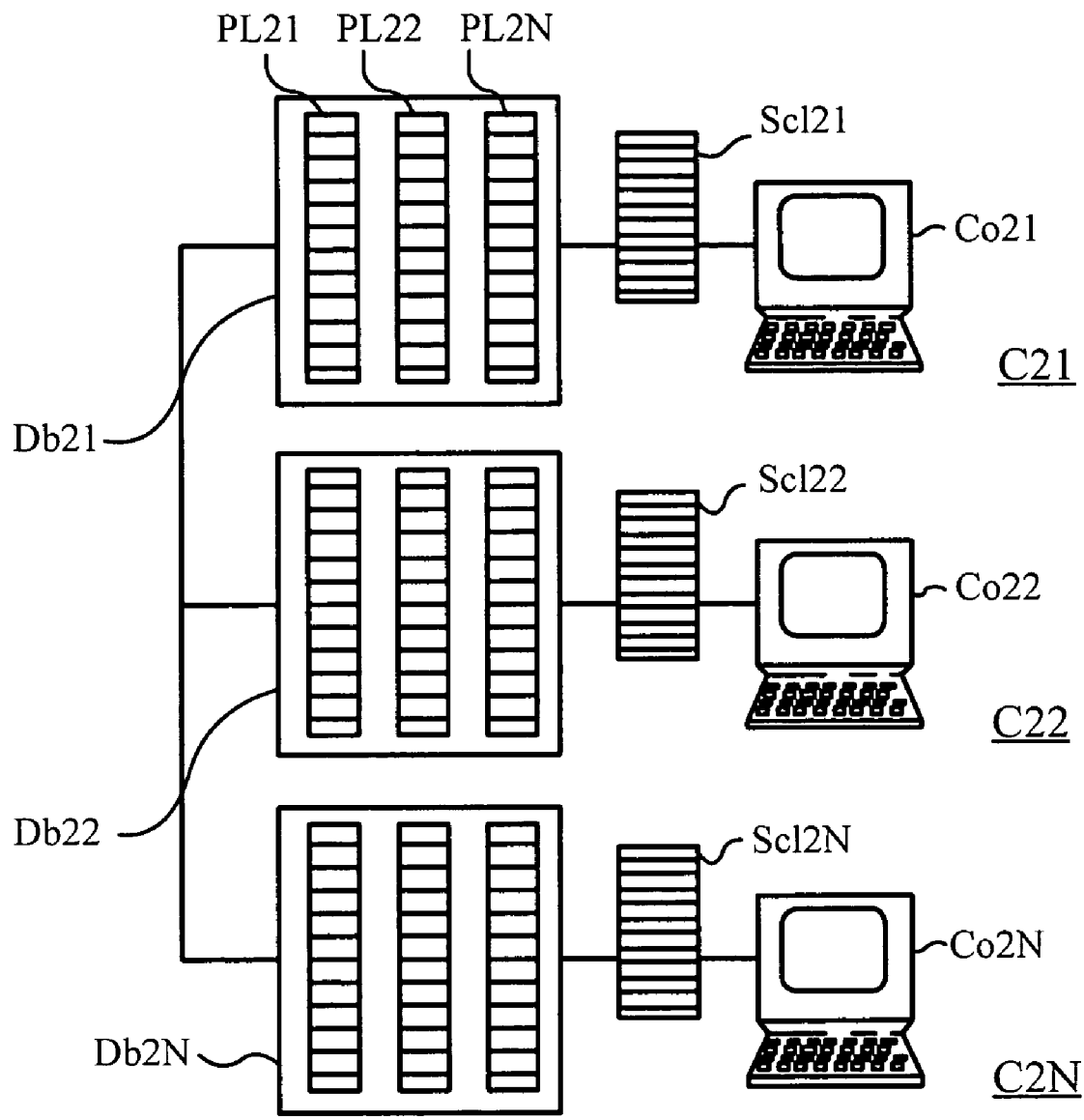
FIG. 15 shows a simplified equalized distribution system architecture.

FIGS. 14A and 15 show two different system architectures in which the RECALL™ system may be embodied. Both system architectures can be implemented in a distributed network such as an intranet or the Internet. FIG. 14A shows the preferred embodiment of a centralistic system architecture incorporated in a web page distribution system 1400. A RECALL™ Web Server S1 operates a web site and is accessible by a number of client users C11-1N via their corresponding client machines Co11-1N.

Figure 14B:
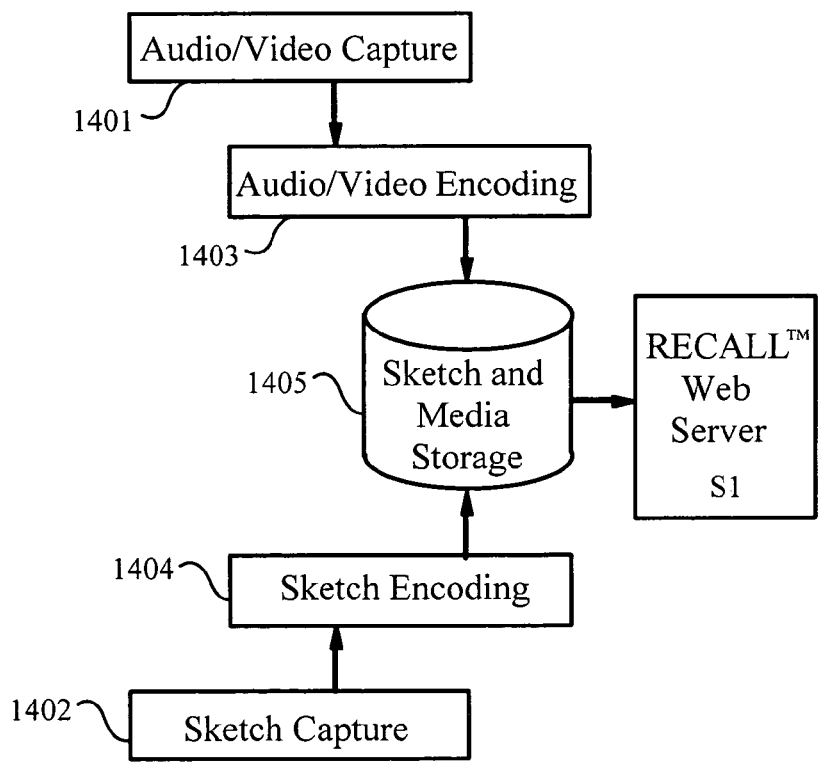
FIG. 14B shows an aspect of the simplified system architecture of FIG. 14A.

FIG. 14B illustrates an aspect of FIG. 14A in which a RECALL™ system comprises an audio/video capture means 1401, an audio/video encoding means 1403, a sketch capture means 1402, and a sketch encoding means 1404. Sketches, drawing movements, and associated multimedia/multimodal interaction information are captured, encoded, and stored in a storage means 1405, which is maintained by the RECALL™ Web Server S1.

As an example, a user C11 employs a computer Co11 to communicate with the RECALL™ Web Server S1. The computer Co11 may be operatively coupled to the audio/video capture means 1401, e.g., a video camcorder, and the sketch capture means 1402, e.g., a digitizer board. After a login event that verifies user C11's identification and/or authorization, user C11 is able to utilize the interactive RECALL™ GUI and the underlying RECALL™ software to create, edit, replay and view sketches and corresponding drawing movements, text, audio, video, or other multimedia/multimodal interaction information. The software components of the interactive RECALL™ GUI can be appreciably implemented in the RECALL™ Web Server S1, in the computer Co11, or suitably augmented. [NOTE: Please correct or verify. Thanks.]

The RECALL™ software enables the client machine Co11 to create and store work files, i.e., script logs Scl11-1N. The script logs Scl11-1N contain all data gathered during the session production phase. The computer Co1 is in bidirectional communication with the server S1, which stores the script log Scl1 in a permanent log PL11.

The permanent log PL11 is the computer readable representation of the creation process of a RECALL™ document. That is, each permanent log is a detailed digital file record of sketching activities captured in a RECALL™ session. It is continuously updated with all scrip logs Sc11-Sc1N that are created on the client machines Co11-Co1N. A database Db10 maintained by the server S1 stores the permanent logs PL1-1N of a number of documents created and edited by the users C11-C1N. Hence, the server S1 is the central storing and redistribution site for all RECALL™ documents created and edited by the users C11-C1N.

When the user C11 wants to retrieve a RECALL™ session for viewing or editing, he/she initiates a retrieval request command via the interactive RECALL™ GUI at the client machine Co11. The retrieval request command is communicated via appropriate communication means to the server S1.

The requested RECALL™ session document is identified, selected, and transmitted in the form of the permanent log PL11 to the client machine Co11 and becomes accessible for replay, editing and viewing. All changes are documented in an additional script log Scl11-Scl1N that is sent back to the server S1, where the newly created script log Scl11-Scl1N is added to the already existing permanent log. The script logs Scl11-Scl1N may be transmitted to the server S1 continuously during the session production phase.

Erasing activity may be captured as a regular part of the creation process and/or subsequently removed from the script log and the permanent log. The RECALL™ system further provides a rewind function to allow the user to rewind and erase the captured creation process up to a chosen moment and to start over again.

The centralistic system architecture may be applied to any form of network where the users C11-C1N can simply logon to the server S1 at any time. Further, the centralistic system architecture may consist of a number of servers S1 that compare and update the context of their respective database Db10 independent of the operation of the client machines Co11-Co1N.

Alternatively, the RECALL™ system implements an equalized system architecture 1500 as shown in FIG. 15. In this case, a number of users C21-C2N independently operate their respective client machines Co21-Co2N, each of which independently maintains a respective database Db21-Db2N. The databases Db21-Db2N are stored on a first direct access storage device (FDASD) and contain a number of permanent logs PL21-PL2N comparable to permanent logs PL11-1N. The RECALL™ software described above resides in a second direct access storing device (SDASD) accessible to the client machines Co21-Co2N.

The storage medium of the SDASD and/or the FDASD may be a removable storage medium like, for instance, a CD or it may be incorporated in the computers Co21-Co2N as it is the case, for instance, in a hard disk drive.

Whenever a computer Co21 establishes a communication connection to other computers Co22-Co2N, the clocks of each computer are verified for synchronicity and eventual synchronized. Then, the databases Db21-Db2N are automatically compared and updated. The equalized system architecture allows users C21-C2N to operate the RECALL™ system independently, in spite of an available wired or wireless network communication connection.

The RECALL™ system architecture is not limited to any particular network communication framework. The centralistic and the equalized system architectures, which may be combined temporarily or in any other feasible scheme, can be appreciably implemented with any suitable network communication technology that offers real time or essentially real time data exchange. The techniques necessary to do this are known to those skilled in the art.

The functional components of the RECALL™ system are written in a commonly known computer language, i.e., Java. Various software development systems provide the tools to create the computer readable code of the RECALL™ system in accordance to the possibilities and needs of the used operating system.

The databases Db10, Db21-Db2N and/or the RECALL™ software may be installable on the computers Co11-Co1N, Co21-Co2N in the form of:
1) a downloadable file accessible via a web page;
2) a self extracting file attached or part of an an email message;
3) incorporated in a web browser;
4) incorporated in an operating system; or
5) a computer readable file stored on a tangible medium like for instance a Compact Disk.

In conclusion, the RECALL™ system disclosed herein provides content and context (the graphic segments synchronized with assocated audio, text, and video) driven capture and replay. A user is able to directly manipulating content in essentially real time. That is, the user can select any graphic segment, i.e., drawing movements, in the sketch and replay through real-time streaming audio-video-graphics from that point on. This content and context driven capture and replay approach allows for future intelligent indexing of content of RECALL™ sessions that reside on a server database.

Preferably, the invention is implemented in a client-server architecture that provides a real time streaming of content from an Internet server, allowing multiple users to replay RECALL™ sessions on any Internet-enabled device. Concurrent and dynamic multiple content streaming of the same content to a number of users is also possible. In other words, the RECALL™ sessions can be distributed to any number of users through real time streaming of audio-video-sketch and does not require the user to record the session for additional replays, thereby enabling efficient information/knowledge/content re-use.

The present invention advantageously provides content-rich multimedia recall, knowledge reuse, synchronous playback, and multimodal interactivity, further enhancing existing interactive technologies such as videoconferencing.

As one skilled in the art will appreciate, most digital computer systems can be programmed to perform the system and method disclosed herein. To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the present invention, it in effect becomes a special purpose computer particular to the present invention. The necessary programming-related techniques are well known to those skilled in the art and thus are not further described herein for the sake of brevity.

Computer programs implementing the present invention can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. Accordingly, the scope of the present invention should be determined by the following claims and their legal equivalents.

What is claimed is:

1. A method for capturing, synchronizing, and replaying a sketching activity and media information associated to said sketching activity, said method comprising:
    a) simultaneously raw timestamped capturing said sketching activity and said media information; wherein
        said sketching activity producing one or more sketch objects, each having a corresponding raw sketch object timestamp, wherein
        said media information includes audio data, and wherein said audio data are captured in an audio file;
    b) transcribing said audio file, recording respectively recognized keywords or phrases and their corresponding raw timestamps;
    c) converting all raw timestamps associated to said one or more sketch objects, said audio file, and said keywords or phrases to common base timestamps; wherein
        said converting includes scaling raw timestamps to a common unit of time and offsetting said scaled timestamps to a same initial time, and wherein
        said converting establishes at least a sketch object common base timestamp and a keyword common base timestamp;
    d) enabling a user to select a starting point for replay, said starting point is one or more of said sketch objects, said keywords, or said phrases;
    e) based on said starting point, synchronizing said one or more sketch objects, said audio file, and said keywords or phrases, utilizing their respective corresponding common base timestamps;
    f) replaying said sketching activity and said media information based on said starting point; and
    g) storing a session start timestamp, an session end timestamp, a raw start time, and a raw end time, wherein
        said sketch object common base timestamp=said raw sketch object timestamp−said session start timestamp;
        said transcribed data common base timestamp=(Tr*Ds/Dr)+Tsst, wherein
    Tr=said raw transcribed data timestamp−said raw start time,
    Ds=said session end timestamp−said session start timestamp,
    Dr=said raw end time−said raw start time, and
    Tsst=said session start timestamp; and wherein
        said keyword common base timestamp=a system clock keyword timestamp−said session start timestamp.

2. The method according to claim 1, further comprising: comparing said sketch object common base timestamp with said keyword common base timestamp associated with said starting point; and
replaying said sketch activity and said media information starting from the latest sketch object drawn before said keyword was spoken.

3. The method according to claim 1, further comprising: synchronously displaying text corresponding to said audio data, synchronously playing video data corresponding to said sketching activity, synchronously playing video data corresponding to said audio data, or a combination thereof.

4. The method according to claim 1, further comprising: importing a background image of which said sketch activity annotates.

5. The method according to claim 1, further comprising: automatically indexing and storing said sketch activity and said media information in a database.

6. The method according to claim 5, further comprising: distributing via real time streaming said sketch activity and said media information over a computer network; wherein said timestamped capturing occurs at a first computer connected thereto and said replaying occurs at a second computer connected thereto.

7. The method according to claim 6, further comprising: enabling a user of said second computer access to said sketch activity and said media information via an interactive graphical user interface.

8. The method according to claim 7, wherein said interactive graphical user interface and said database are maintained by a server connected to said computer network.

9. The method according to claim 6, wherein said computer network is characterized as an intranet, the Internet, or a combination thereof, said computer network comprising wired and wireless communication links.

10. A digital computer system programmed to perform the method of claim 1.

11. A computer-readable medium storing a computer program implementing the method of claim 1.

* * * * *